United States Patent
Eo et al.

(10) Patent No.: US 9,670,991 B2
(45) Date of Patent: *Jun. 6, 2017

(54) TRANSMISSION FOR VEHICLE

(71) Applicant: Hyundai Motor Company, Seoul (KR)

(72) Inventors: Soon Ki Eo, Ansan-si (KR); Chon Ok Kim, Yongin-si (KR); Hyun Chul Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/818,537

(22) Filed: Aug. 5, 2015

(65) Prior Publication Data
US 2016/0230864 A1     Aug. 11, 2016

(30) Foreign Application Priority Data

Feb. 5, 2015   (KR) ........................ 10-2015-0018084

(51) Int. Cl.
  *F16H 3/085*   (2006.01)
  *F16H 3/00*   (2006.01)

(52) U.S. Cl.
  CPC ....... *F16H 3/006* (2013.01); *F16H 2003/007* (2013.01)

(58) Field of Classification Search
  CPC . F16H 3/085; F16H 2003/007; F16H 37/0806
  See application file for complete search history.

(56) References Cited

U.S. PATENT DOCUMENTS

| | | | | |
|---|---|---|---|---|
| 2005/0204842 A1* | 9/2005 | Baldwin | ................. | F16H 3/006 74/331 |
| 2008/0245166 A1* | 10/2008 | Baldwin | ................. | F16H 3/006 74/331 |
| 2013/0167676 A1* | 7/2013 | Dreibholz | ................ | B60K 6/36 74/330 |
| 2013/0263682 A1* | 10/2013 | Eo | ........................... | F16H 3/006 74/331 |
| 2016/0223061 A1* | 8/2016 | Park | ........................ | F16H 3/006 |
| 2016/0298741 A1* | 10/2016 | Eo | ........................ | F16H 37/0806 |

FOREIGN PATENT DOCUMENTS

| | | |
|---|---|---|
| JP | 2011-33045 A | 2/2011 |
| JP | 2013-204676 A | 10/2013 |
| KR | 10-2012-0043347 A | 5/2012 |
| KR | 10-1339269 B1 | 12/2013 |
| KR | 10-1459482 B1 | 11/2014 |

\* cited by examiner

*Primary Examiner* — Huan Le
(74) *Attorney, Agent, or Firm* — Morgan Lewis & Bockius LLP

(57) ABSTRACT

A transmission for a vehicle may include a first input shaft selectively receiving power from an engine, a second input shaft continuously receiving power from the engine, a first output shaft and a second output shaft disposed in parallel to the first input shaft and the second input shaft, respectively, a first shift device configured to make a series of desired gear shift ranges between the first input shaft and the and the first output shaft and between the first input shaft and the second output shaft, and a second shift device configured to make duplicate gear shift ranges, which have a gear ratio identical to a gear ratio of one or more gear shift ranges of the series of gear shift ranges made by the first shift device, using the second input shaft.

17 Claims, 10 Drawing Sheets

TRANSMISSION FOR VEHICLE

CROSS REFERENCE TO RELATED APPLICATION

The present application claims priority to Korean Patent Application Number 10-2015-0018084 filed Feb. 5, 2015, the entire contents of which is incorporated herein for all purposes by this reference.

BACKGROUND OF THE INVENTION

Field of the Invention

The present invention relates to a transmission for a vehicle. More particularly, the present invention relates to the configuration of a transmission that can automatically shift, based on a synchro-mesh type shifting mechanism that is generally used for manual transmissions.

Description of Related Art

In the related art, an AMT Automated Manual Transmission (AMT) includes a clutch actuator for connecting/disconnecting a clutch and a shift actuator for engaging shift gears and disengaging desired shift gears and can automatically shift by operating the clutch actuator and the shift actuator in accordance with the driving states of a vehicle.

However, according to the AMT, it is required to cut torque from the clutch actuator to the AMT in order to disengage a previous shift gear and engage a new desired shift gear by operating the shift actuator, so interruption of torque that is supposed to be supplied to driving wheels from an engine is generated, which interferes with smooth shifting and deteriorates riding comfort.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for a vehicle that can prevent deterioration of smooth shifting and riding comfort due to torque interruption, can be more conveniently mounted in a vehicle in a relatively simple and compact configuration, and can contribute to improving fuel efficiency.

According to various aspects of the present invention, a transmission for a vehicle may include a first input shaft selectively receiving power from an engine, a second input shaft continuously receiving power from the engine, a first output shaft and a second output shaft disposed in parallel to the first input shaft and the second input shaft, respectively, a first shift device configured to make a series of desired gear shift ranges between the first input shaft and the and the first output shaft and between the first input shaft and the second output shaft, and a second shift device configured to make duplicate gear shift ranges, which have a gear ratio identical to a gear ratio of one or more gear shift ranges of the series of gear shift ranges made by the first shift device, using the second input shaft.

The second shift device may be configured to make the duplicate gear shift ranges between the second input shaft and the second output shaft.

A first output gear for drawing power may be disposed on the first output shaft, a second output gear for transferring power to a differential may be disposed on the second output shaft, and power transmitted through the first output gear from the first output shaft may be transmitted to the second output shaft through a power connection mechanism.

A first output gear for transferring power to a differential may be disposed on the first output shaft, and a second output gear for transferring power to the differential may be disposed on the second output shaft.

The second shift device may be configured to make the duplicate gear shift ranges between the second input shaft and the first output shaft.

The second shift device may be configured to make the duplicate gear shift ranges between the second input shaft and the first output shaft and between the second input shaft and the second output shaft.

The power connection mechanism may include an idler gear engaged with the first output gear, and a receive gear disposed on the second output shaft to engage with the idler gear.

A first output gear for transferring power to a differential may be disposed on the first output shaft, and a second output gear for transferring power to the differential may be disposed on the second output shaft.

All of gear shift ranges made by the first shift device may be a series of gear shift ranges from a first gear shift range having a largest gear ratio and an n-th gear shift range having a smallest gear ratio, and duplicate gear shift ranges made by the second shift device may be first to m-th gear shift ranges, in which n and m are natural numbers, and m is less than or equal to n.

The first shift device may include a plurality of first unit driving gears non-rotatably disposed on the first input shaft, a plurality of first unit driven gears rotatably disposed on the first output shaft and the second output shaft to make all of the gear shift ranges by engaging with the first unit driving gears, respectively, and a plurality of first unit synchronizers disposed on the first output shaft and the second output shaft to allow and prevent rotation of the first unit driven gears with respect to the first output shaft and the second output shaft, respectively.

The second shift device may include a plurality of second unit driving gears rotatably disposed on the second input shaft, a plurality of second unit driven gears non-rotatably disposed on the second output shaft to make the duplicate gear shift ranges by engaging with the second unit driving gears, and a plurality of second unit synchronizers disposed on the second input shaft to selectively allow and prevent rotation of the second unit driving gears with respect to the second input shaft.

The second shift device may include a plurality of second unit driving gears rotatably disposed on the second input shaft, a plurality of second unit driven gears non-rotatably disposed on the first output shaft to make the duplicate gear shift ranges by engaging with the second unit driving gears, and a plurality of second unit synchronizers disposed on the second input shaft to selectively allow and prevent rotation of the second unit driving gears with respect to the second input shaft.

The first input shaft may be connected to the engine through a clutch to selectively receive power from the engine.

The first input shaft may be a hollow shaft surrounding the second input shaft.

According to the present invention, the transmission for vehicle can prevent deterioration of smooth shifting and riding comfort due to torque interruption and has a relatively simple and compact configuration, so it can be easily mounted in a vehicle and can contribute to improving fuel efficiency.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1 to FIG. 10, a transmission for a vehicle according to various embodiments of the present invention, in common, includes a first input shaft IN1 that selectively receives power from an engine E, a second input shaft IN2 that continuously receives power from the engine E, a first output shaft OUT1 and a second output shaft OUT2 disposed in parallel with the first input shaft IN1 and the second input shaft IN2, respectively, a first shift device SU1 that makes a series of desired gear shift ranges between the first input shaft IN1 and the first output shaft OUT1 and between the first input shaft IN1 and the second output shaft OUT2, and a second shift device SU2 that makes a duplicate gear shift range, which has a gear ratio identical to the gear ratio of one or more gear shift ranges of the series of gear shift ranges made by the first shift device SU1, using the second input shaft IN2.

That is, according to the transmission of the present invention, the power from the engine E can be transmitted to a differential through a line from the first input shaft IN1 to the first shift device SU1 and another line from the second input shaft IN2 to the second shift device SU2, and particularly, the first shift device SU1 and the second shift device SU2 can make gear shift ranges having the same gear ratios in duplicate. Accordingly, the power from the engine E is shifted through both of the first shift device SU1 and the second shift device SU2 and transmitted to the differential, or shifted through any one of the shift devices and then transmitted to the differential DF.

In various embodiments, the first input shaft IN1 is connected to the engine E through a clutch to selectively receive power from the engine E and is a hollow shaft surrounding the second input shaft IN2.

Figure 1:
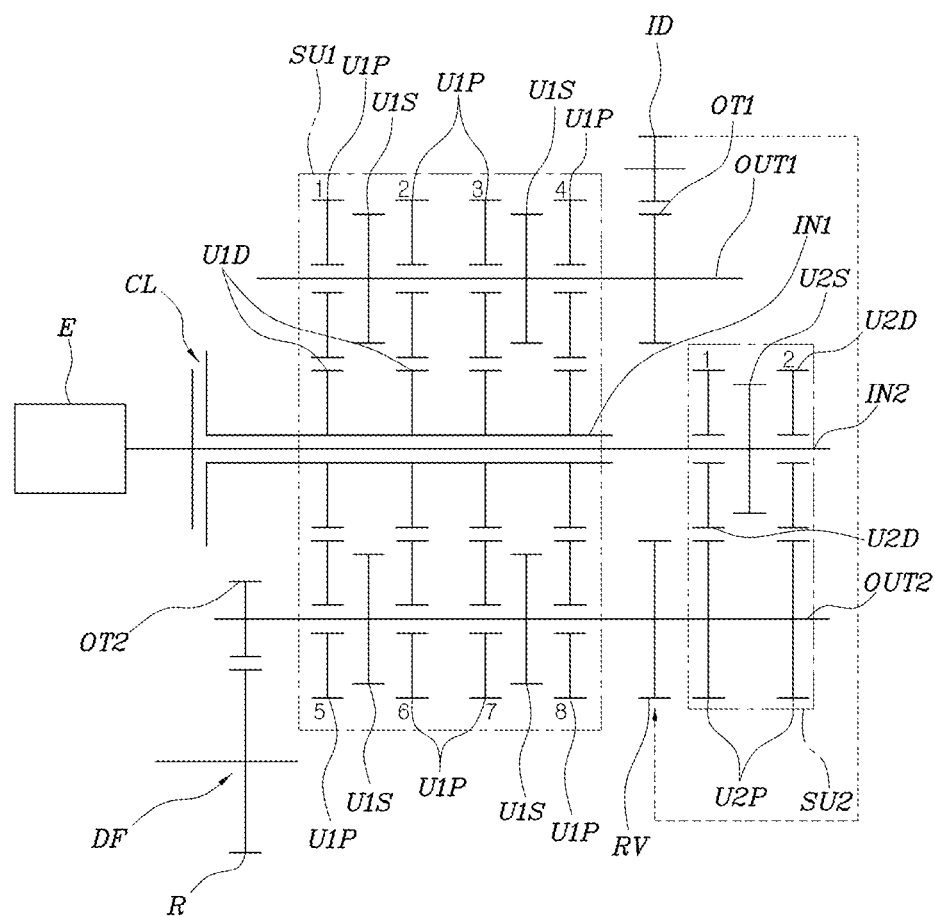
FIG. 1 is a diagram showing a configuration of an exemplary transmission for a vehicle according to the present invention.

In the various embodiments shown in FIG. 1, the second shift device SU2 makes the duplicate gear shift ranges between the second input shaft IN2 and the second output shaft OUT2.

Figure 10:
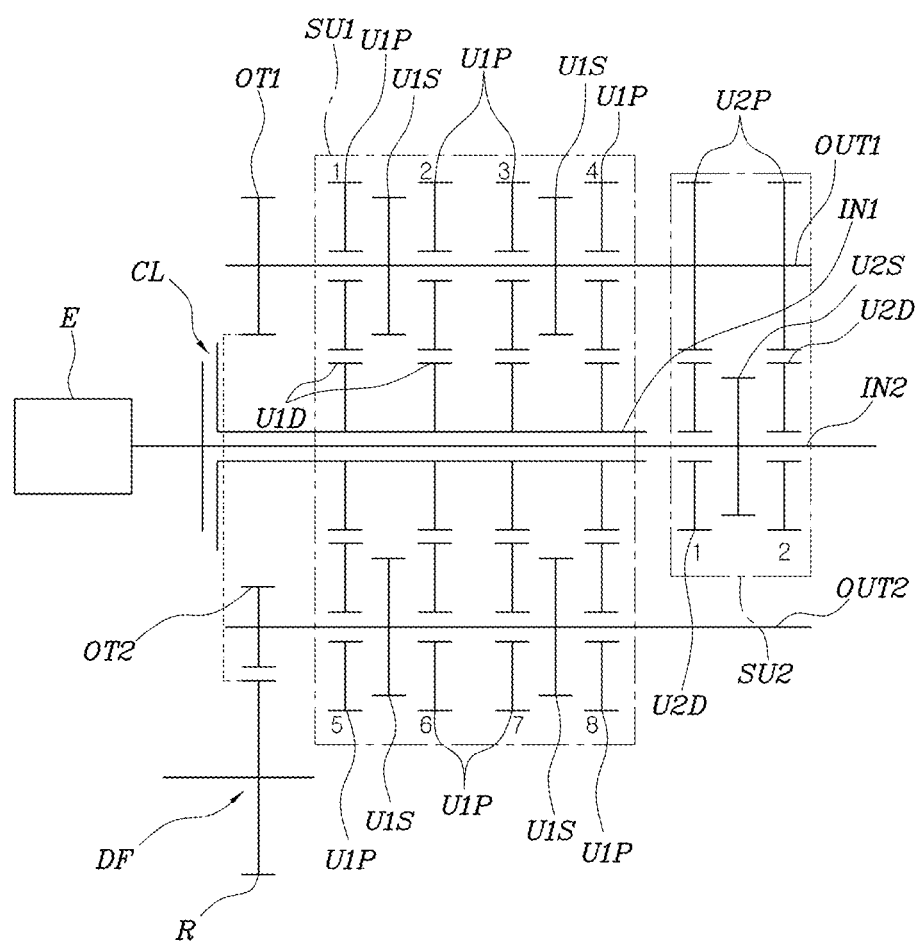
FIG. 10 is a diagram showing an exemplary transmission for a vehicle according to the present invention.

In the various embodiments shown in FIG. 10, the second shift device SU2 makes the duplicate gear shift ranges between the second input shaft IN2 and the first output shaft OUT1.

Obviously, the second shift device SU2 may make the duplicate gear shift ranges between the second input shaft IN2 and the first output shaft OUT1 and between the second input shaft IN2 and the second output shaft OUT2, by combining the configurations of the various embodiments shown in FIG. 1 and the various embodiments shown in FIG. 10.

In the various embodiments shown in FIG. 1, a first output gear OT1 for drawing power is disposed on the first output shaft OUT1 and a second output gear OT2 for transferring power to the differential DF is disposed on the second output shaft OUT2, so power outputted through the first output gear OT1 from the first output shaft OUT1 is transmitted to the second output shaft OUT2 through a power connection mechanism.

The power connection mechanism includes an idler gear ID engaged with the first output gear OT1 and a receive gear RV disposed on the second output shaft OUT2 to engage with the idler gear ID, so the power from the first output shaft OUT1 is transmitted to the second output shaft OUT2 sequentially through the first output gear OT1, the idler gear ID, and the receive gear RV and then outputted to the differential DF through the second output gear OT2.

On the other hand, in the various embodiments shown in FIG. 10, the power connection mechanism is not provided, but a first output gear OT1 for transferring power to a differential DF is disposed on the first output shaft OUT1 and a second output gear OT2 for transferring power to the differential DF is disposed on the second output shaft OUT2 so that power can be transferred to the differential DF from the first output shaft OUT1 and the second output shaft OUT2, and the first output gear OT1 and the second output gear OT2 are both engaged with a ring gear R of the differential DF.

In the various embodiments, all of gear shift ranges made by the first shift device SU1 are a series of gear shift ranges from a first gear shift range having the largest gear ratio and an n-th gear shift range having the smallest gear ratio, and duplicate gear shift ranges made by the second shift device SU2 are first to m-th gear shift ranges (n and m are natural number, m≤n).

That is, in the various embodiments shown in FIG. 1 and the various embodiments shown in FIG. 10, the first shift device SU1 makes all of gear shift ranges (first to eight gear shift ranges) required by a vehicle and the second shift device SU2 makes some gear shift ranges (first and second gear shift ranges) sequentially from the gear shift range having the largest gear ratio all of the gear shift ranges made by the first shift range SU1, so n is 8 and m is 2 in these cases.

The reason of m≤n is that the duplicate gear shift ranges made by the second shift device SU2 play an important part in preventing torque interruption that is generated in shifting and the torque interruption influences smooth shifting and riding comfort when a vehicle is driven at a low speed with a relatively large gear ratio.

That is, for example, as in the various embodiments shown in FIG. 1 and the various embodiments shown in FIG. 10, if a vehicle has a total of five forward gear shift ranges, the ranges where there is a problem with smooth shifting or riding comfort due to torque interruption while the vehicle is driven are the first gear shift range to the third gear shift range, but torque interruption does not influence smooth shifting or riding comfort at higher gear shift ranges, because the speed and the inertia of the vehicle are substantially high and large at those ranges. Accordingly, the second shift device SU2 makes first and second duplicate gear shift ranges having the same gear ratios as those of low gear shift ranges in order to improve torque interruption that may be generated at the first gear shift range to the third gear shift range.

Obviously, the number of duplicate gear shift ranges that are made by the second shift device SU2 may be increased or decreased in accordance with the design concept of a vehicle to be manufactured, but a plurality of duplicate gear shift ranges can be continuously made sequentially from the gear shift range having the largest gear ratio.

The first shift device SU1 and the second shift device SU2 both can make a plurality of gear shift ranges in a synchro-mesh type. The first shift device SU1 includes a plurality of first unit driving gears U1D non-rotatably disposed on the first input shaft IN1, a plurality of first unit driven gears U1P rotatably disposed on the first output shaft OUT1 and the second output shaft OUT2 to make all of the gear shift ranges by engaging with the first unit driving gears U1D, respectively, and a plurality of first unit synchronizers U1S disposed on the first output shaft OUT1 and the second output shaft OUT2 to allow and prevent rotation of the first unit driven gears U1P with respect to the first output shaft OUT1 and the second output shaft OUT2, respectively.

In the various embodiments shown in FIG. 1, the second shift device SU2 includes a plurality of second unit driving gears U2D rotatably disposed on the second input shaft IN2, a plurality of second unit driven gears U2P non-rotatably disposed on the second output shaft OUT2 to make the duplicate gear shift ranges by engaging with the second unit driving gears U2D, and a plurality of second unit synchronizers U2S disposed on the second input shaft IN2 to allow and prevent rotation of the second unit driving gears U2D with respect to the second input shaft IN2.

In the various embodiments shown in FIG. 10, the second shift device SU2 includes: a plurality of second unit driving gears U2D rotatably disposed on the second input shaft IN2, a plurality of second unit driven gears U2P non-rotatably disposed on the first output shaft OUT1 to make the duplicate gear shift ranges by engaging with the second unit driving gears U2D, and a plurality of second unit synchronizers U2S disposed on the second input shaft IN2 to allow and prevent rotation of the second unit driving gears U2D with respect to the second input shaft IN2.

The operation of the transmission for a vehicle which has the configuration described above in accordance with various embodiments shown in FIG. 1 is described with reference to FIG. 1 to FIG. 9.

For reference, the second output gear OT2 on the second output shaft OUT2 is engaged with the ring gear R of the differential DF in FIG. 1, so it can transfer power to the differential DF.

FIG. 1 shows a neutral state, in which the first unit synchronizers U1S and the second unit synchronizers U2S are in a neutral state, so the engine E can be started regardless of whether the clutch CL is engaged or disengaged, but the clutch CL has been disengaged in FIG. 1.

Figure 2:
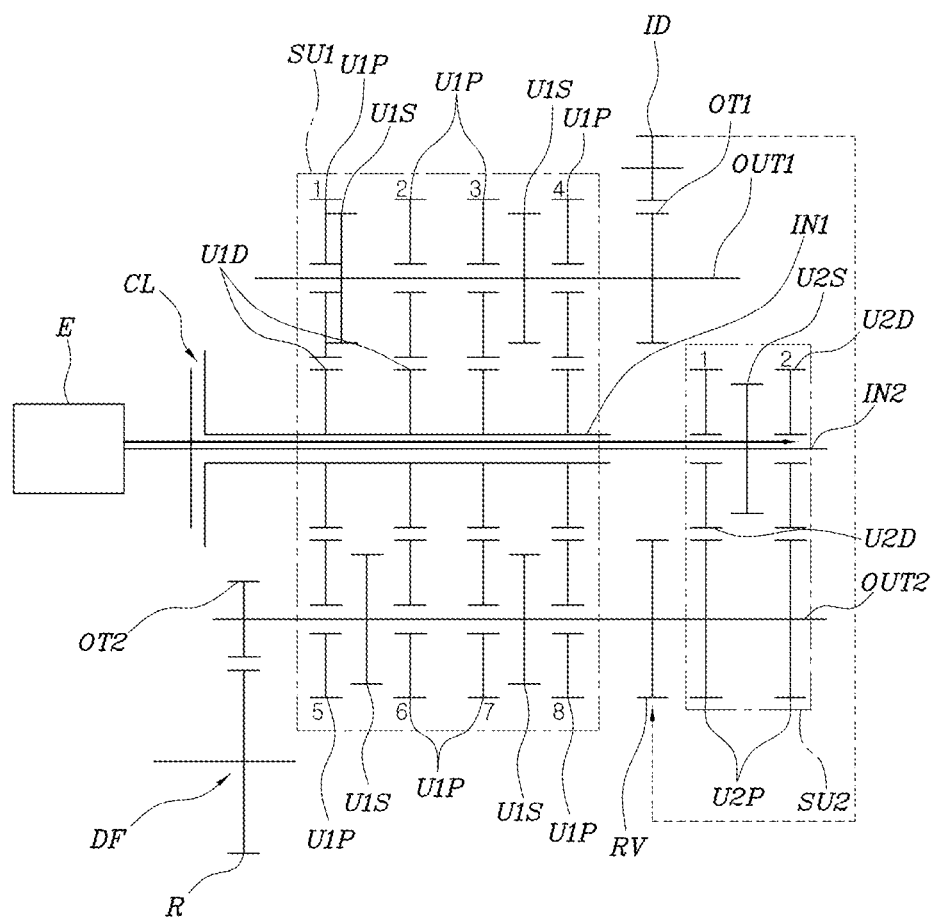
FIG. 2, FIG. 3, FIG. 4 and FIG. 5 are diagrams illustrating an operation of the exemplary transmission shown in FIG. 1 from a neutral state to a first gear-driving state.
Figure 3:
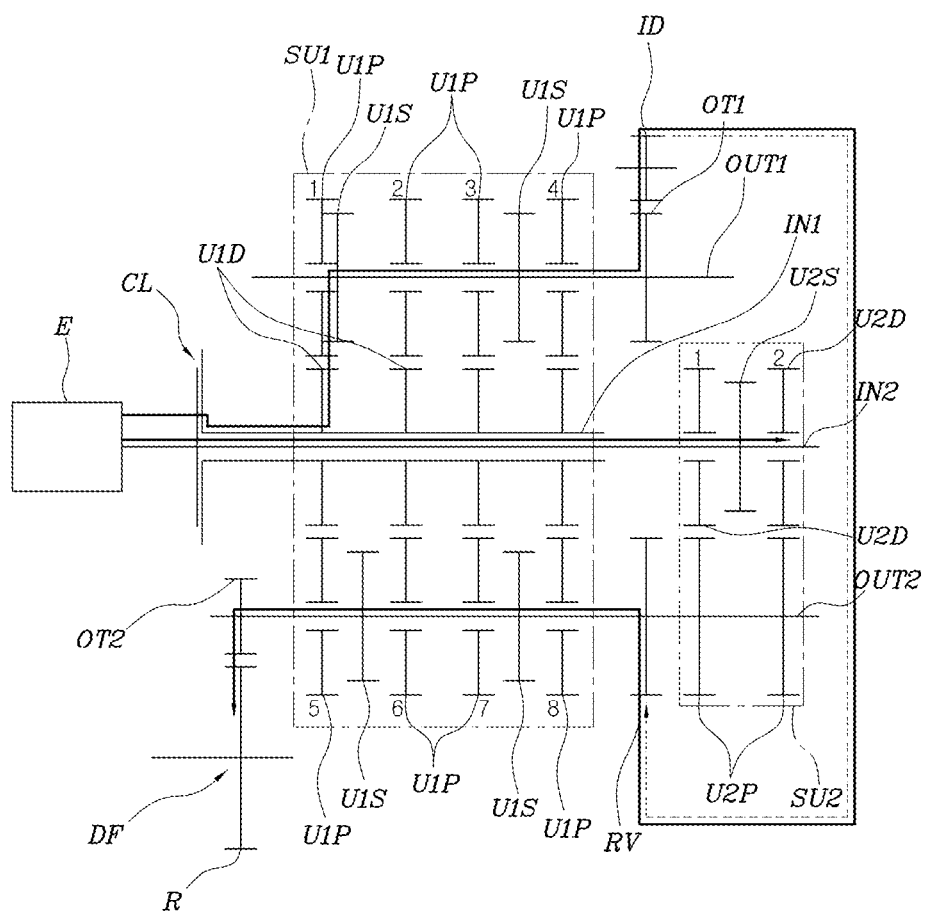

When the engine E is started in the state of FIG. 1, the first gear shift range is made by the first shift device SU1, as in FIG. 2, and then the clutch CL is engaged, as in FIG. 3, the power from the engine E is shifted through the first shift device SU1 and transferred to the first output shaft OUT1. The power is continuously transmitted to the second output shaft OUT2 through the first output gear OT1, the idler gear ID, and the receive gear RV and then transferred to the differential DF through the second output gear OT2 on the second output shaft OUT2, so the vehicle is started in the first gear shift range.

Figure 4:
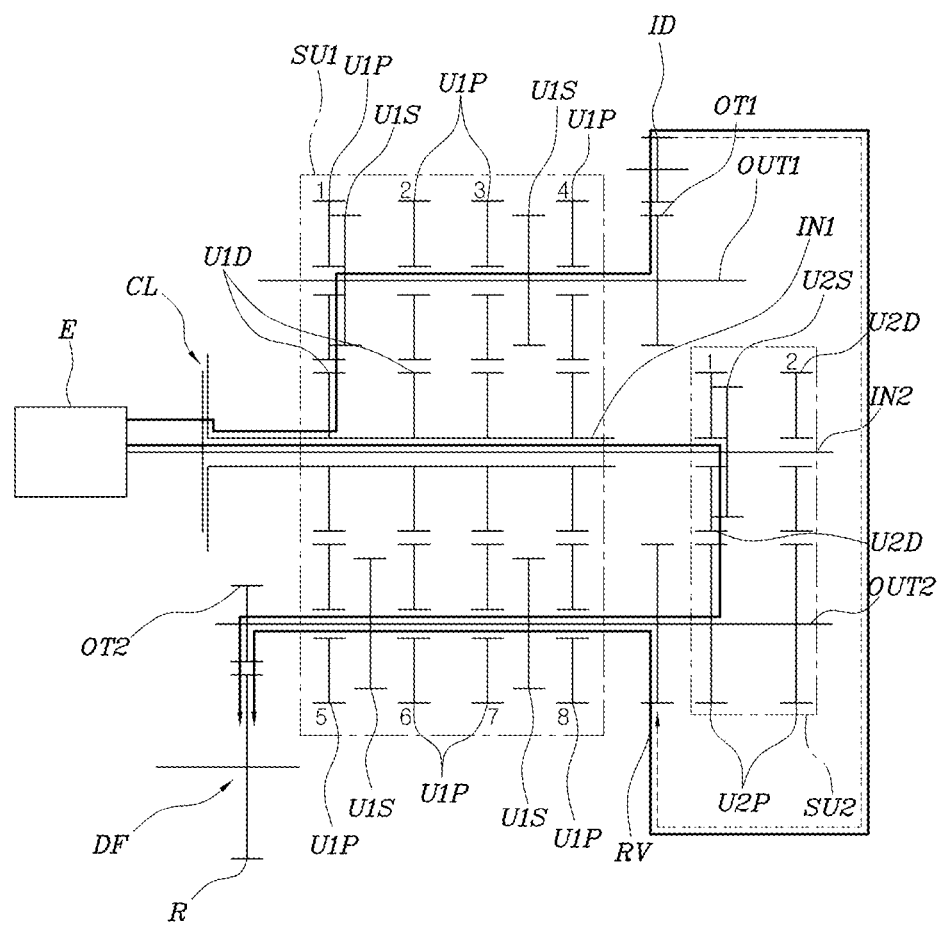

After the vehicle is started in the state shown in FIG. 3, the second shift device SU2 makes a first gear shift range in duplicate, as in FIG. 4. Accordingly, in this state, the power from the engine E is transferred to the differential DF through both of the first shift device SU1 and the second shift device SU2.

Figure 5:
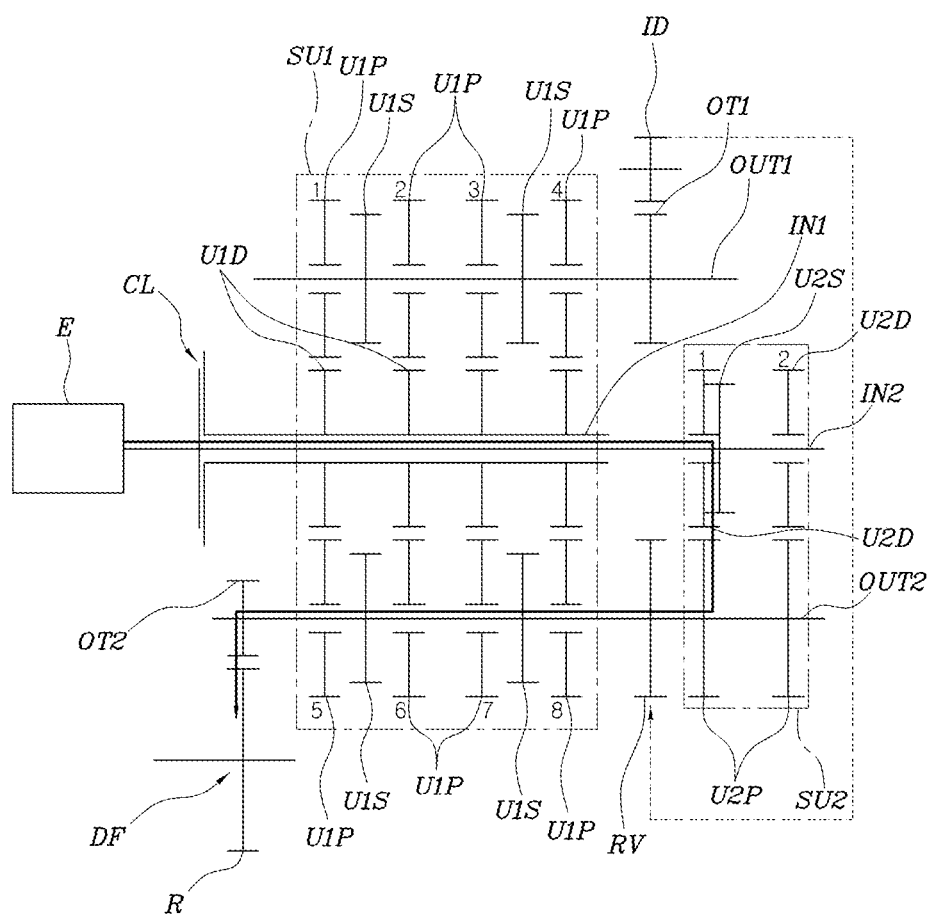

In the state shown in FIG. 5, the first gear shift range made by the first shift device SU1 requires shifting to neutral to prepare for shifting to the second gear shift range, in which, similarly, the power from the engine E is continuously supplied to the differential DF with the first gear shift range made by the second shift device SU2.

Figure 6:
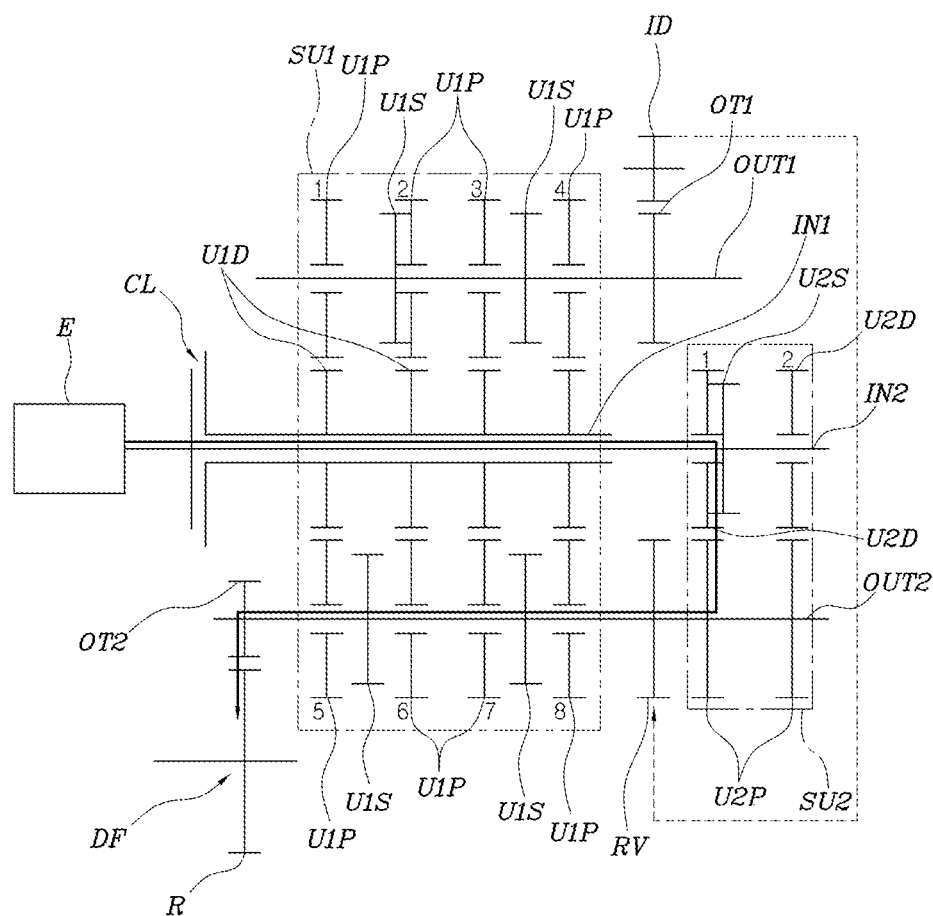
FIG. 6, FIG. 7, FIG. 8 and FIG. 9 are diagrams illustrating an operation of the exemplary transmission shown in FIG. 1 from the first gear-driving state to a second gear-driving state.

FIG. 6 shows a state when the clutch CL has been disengaged and the first shift device SU1 has made the second gear shift range from the state of FIG. 5, in which, similarly, the second input shaft IN2 directly receives the power from the engine E regardless of whether the clutch CL is disengaged or not, so the output at the first gear shift range is continuously transmitted to the differential DF through the second shift device SU2.

Figure 7:
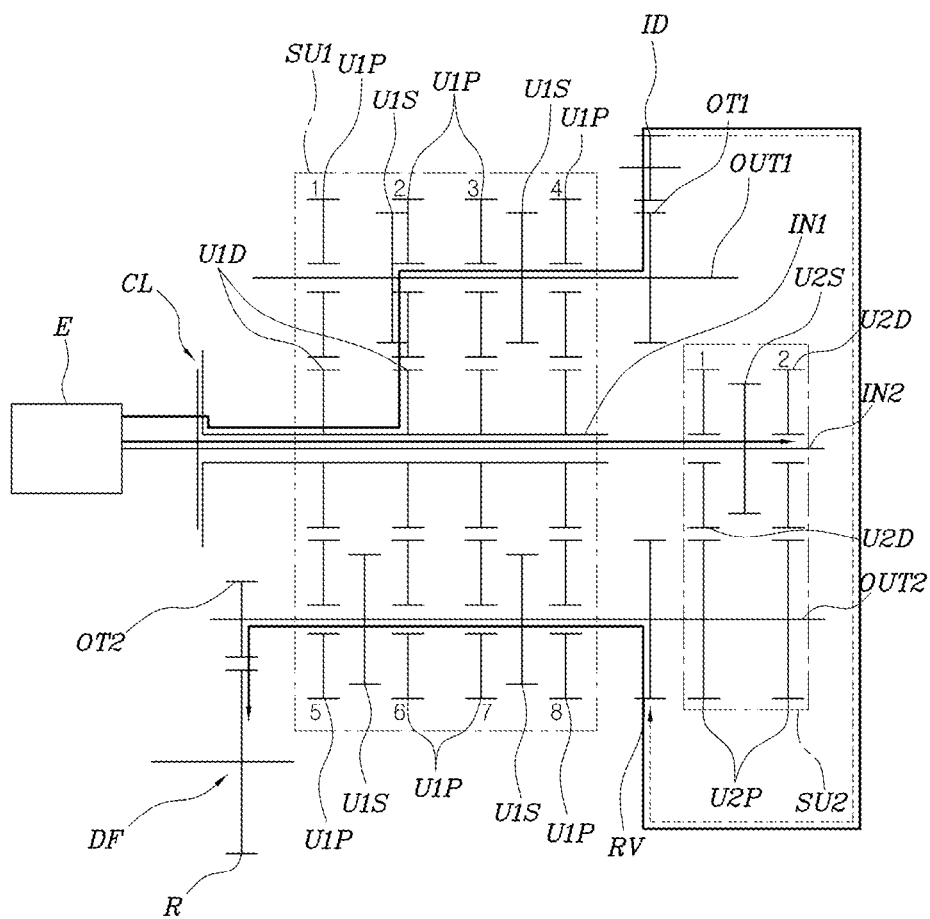

FIG. 7 shows shifting to the second gear shift range by engaging the clutch CL from the state of FIG. 6, in which power transmitted through the clutch CL starts to be supplied to the differential DF, with the gear ratio of the second gear shift range through the first shift device Sill.

In this case, interlocking between the power transmitted through the second shift device SU2 and the power shifted for the second gear shift range through the first shift range SU1 is prevented by starting to engage the clutch and disengaging the first gear shift range made by the second shift device SU2.

Accordingly, in this state, the vehicle is driven by the power at the first gear shift range through the second shift device SU2, and when the clutch CL is engaged, the power is shifted directly to the second gear shift range through the first shift device SU1 without torque interruption, so shifting is smoothly performed and riding comfort is improved.

Figure 8:
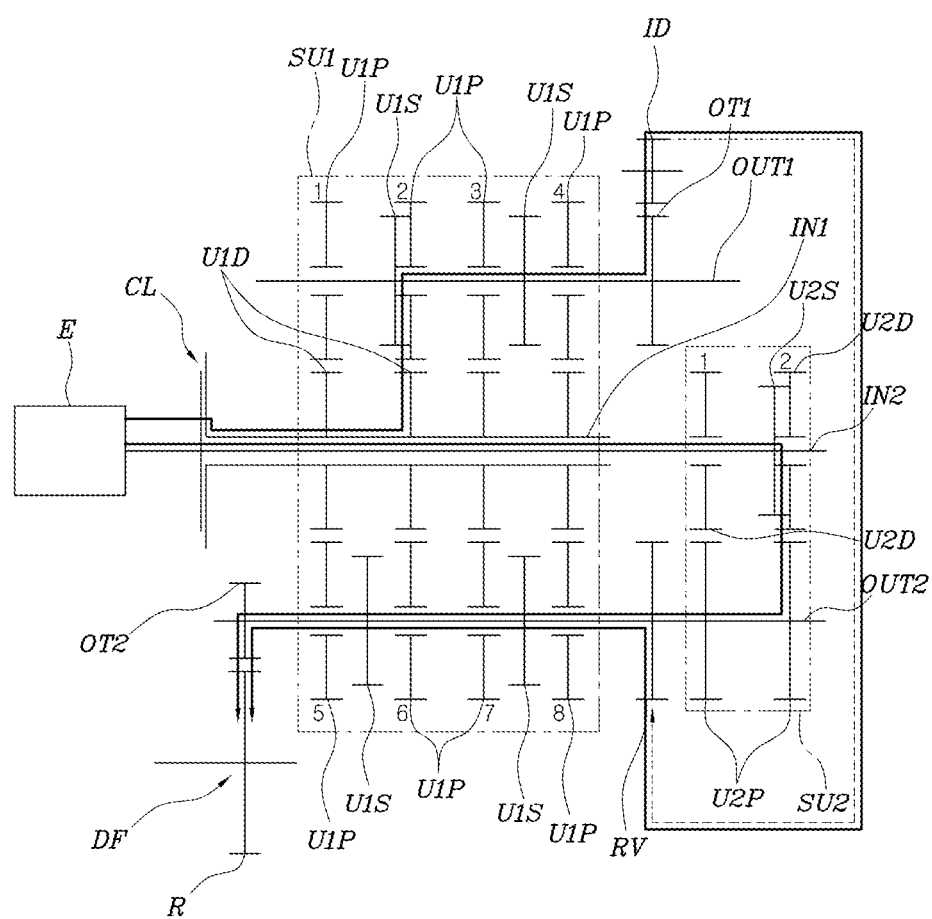

In the state shown in FIG. 8, the second gear shift range is made by the second shift device SU2 from the state of FIG. 7, so the power from the engine E is supplied with the gear ratio of the second gear shift range to the differential DF through both of the first shift device SU1 and the second shift device SU2.

Figure 9:
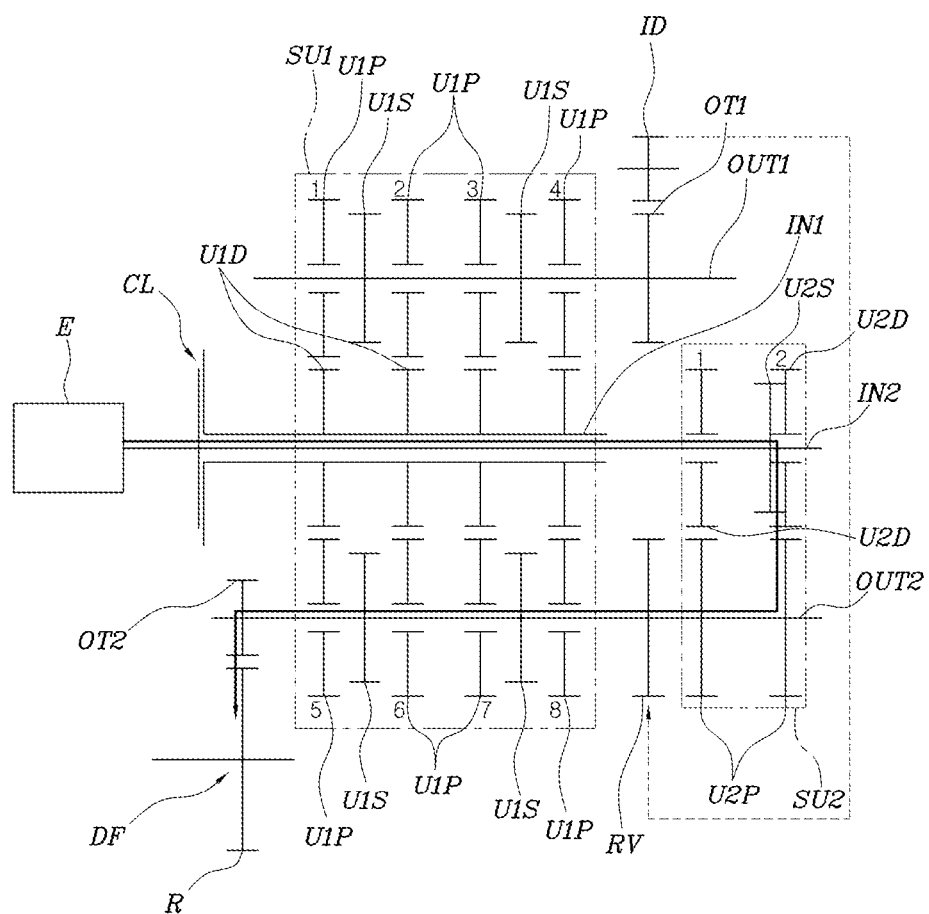

FIG. 9 shows a state when the second gear shift range by the first shift device SU1 is disengaged from the state of FIG. 8, in which preparing for shifting to the third gear shift range is performed, and similarly, the power from the engine E is transferred with the gear ratio of the second gear shift range through the second shift device SU2.

Similar to shift to the second gear shift range from the first gear shift range, shifting to the third gear shift range from the state shown in FIG. 9 can be performed without torque interruption by disengaging the clutch CL, engaging the third gear shift range through the first shift device SU1, and then engaging the clutch CL and disengaging the second gear shift range through the second shift device SU2.

Obviously, in the various embodiments, shifting to the fourth to eighth gear shift ranges is performed, similar to the related art, by disengaging the clutch CL, disengaging the previous gear shift range, engaging the desired gear shift range, and then disengaging the clutch CL only through the first shift device Sill. Accordingly, although torque interruption is generated, as in the related art, they are higher gear shift ranges, so it does not largely influence smooth shifting or riding comfort, as described above.

Further, unlike the various embodiments, if the second shift device SU2 can make duplicate gear shift ranges identical to all of the gear shift ranges made by the first shift device SU1, torque interruption can be prevented in shifting to all of the gear shift ranges.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle, comprising:
   a first input shaft selectively receiving power from an engine;
   a second input shaft continuously receiving power from the engine;
   a first output shaft and a second output shaft disposed in parallel to the first input shaft and the second input shaft, respectively;
   a first shift device configured to make a series of desired gear shift steps between the first input shaft and the first output shaft and between the first input shaft and the second output shaft; and
   a second shift device configured to make duplicate gear shift steps, which have a gear ratio identical to a gear ratio of one or more gear shift steps of the series of gear shift steps made by the first shift device, using the second input shaft.

2. The transmission of claim 1, wherein the second shift device is configured to make the duplicate gear shift steps between the second input shaft and the second output shaft.

3. The transmission of claim 2, wherein a first output gear for drawing power is disposed on the first output shaft and a second output gear is disposed on the second output shaft and directly connected to a differential, and
   power transmitted through the first output gear from the first output shaft is transmitted to the second output shaft through a power connection mechanism.

4. The transmission of claim 2, wherein a first output gear is disposed on the first output shaft and directly connected to a differential, and
   a second output gear is disposed on the second output shaft and directly connected to the differential.

5. The transmission of claim 1, wherein the second shift device is configured to make the duplicate gear shift steps between the second input shaft and the first output shaft.

6. The transmission of claim 5, wherein a first output gear for drawing power is disposed on the first output shaft and a second output gear is disposed on the second output shaft and directly connected to a differential, and
   power transmitted through the first output gear from the first output shaft is transmitted to the second output shaft through a power connection mechanism.

7. The transmission of claim 5, wherein a first output gear is disposed on the first output shaft and directly connected to a differential, and
   a second output gear is disposed on the second output shaft and directly connected to the differential.

8. The transmission of claim 1, wherein the second shift device is configured to make the duplicate gear shift steps between the second input shaft and the first output shaft and between the second input shaft and the second output shaft.

9. The transmission of claim 8, wherein a first output gear for drawing power is disposed on the first output shaft and a second output gear is disposed on the second output shaft and directly connected to a differential, and
   power transmitted through the first output gear from the first output shaft is transmitted to the second output shaft through a power connection mechanism.

10. The transmission of claim 9, wherein the power connection mechanism includes:
    an idler gear engaged with the first output gear; and
    a receive gear disposed on the second output shaft to engage with the idler gear.

11. The transmission of claim 8, wherein a first output gear is disposed on the first output shaft and directly connected to a differential, and
    a second output gear is disposed on the second output shaft and directly connected to the differential.

12. The transmission of claim 1, wherein all of gear shift steps made by the first shift device are a series of gear shift steps from a first gear shift step having a largest gear ratio and an n-th gear shift step having a smallest gear ratio, and duplicate gear shift steps made by the second shift device are first to m-th gear shift steps, and wherein n and m are natural numbers, and m is less than or equal to n.

13. The transmission of claim 12, wherein the first shift device includes:
    a plurality of first unit driving gears non-rotatably disposed on the first input shaft;
    a plurality of first unit driven gears rotatably disposed on the first output shaft and the second output shaft to make all of the gear shift steps by engaging with the first unit driving gears, respectively; and a plurality of first unit synchronizers disposed on the first output shaft and the second output shaft to allow and prevent rotation of the first unit driven gears with respect to the first output shaft and the second output shaft, respectively.

14. The transmission of claim 13, wherein the second shift device includes:

a plurality of second unit driving gears rotatably disposed on the second input shaft;

a plurality of second unit driven gears non-rotatably disposed on the second output shaft to make the duplicate gear shift steps by engaging with the second unit driving gears; and a plurality of second unit synchronizers disposed on the second input shaft to selectively allow and prevent rotation of the second unit driving gears with respect to the second input shaft.

15. The transmission of claim 13, wherein the second shift device includes:

a plurality of second unit driving gears rotatably disposed on the second input shaft;

a plurality of second unit driven gears non-rotatably disposed on the first output shaft to make the duplicate gear shift steps by engaging with the second unit driving gears; and a plurality of second unit synchronizers disposed on the second input shaft to selectively allow and prevent rotation of the second unit driving gears with respect to the second input shaft.

16. The transmission of claim 13, wherein the first input shaft is connected to the engine through a clutch to selectively receive power from the engine.

17. The transmission of claim 16, wherein the first input shaft is a hollow shaft surrounding the second input shaft.

* * * * *